(12) United States Patent
Diehl et al.

(10) Patent No.: US 8,430,402 B2
(45) Date of Patent: Apr. 30, 2013

(54) NETWORKED LIGHT BULB WITH COLOR WHEEL FOR CONFIGURATION

(75) Inventors: William Diehl, Dove Canyon, CA (US); Karl Jonsson, Rancho Santa Margarita, CA (US); Sonny Windstrup, Copenhagen (DK)

(73) Assignee: Greenwave Reality PTE Ltd., Singapore (SG)

( * ) Notice: Subject to any disclaimer, the term of this patent is extended or adjusted under 35 U.S.C. 154(b) by 278 days.

(21) Appl. No.: 12/795,406

(22) Filed: Jun. 7, 2010

(65) Prior Publication Data

US 2011/0095709 A1 Apr. 28, 2011

Related U.S. Application Data

(60) Provisional application No. 61/254,709, filed on Oct. 25, 2009.

(51) Int. Cl.
*A63B 71/00* (2006.01)
(52) U.S. Cl.
USPC ............... 273/143 A; 273/142 R; 273/138.1; 273/139; 273/280
(58) Field of Classification Search .......... 315/312–324, 315/291, 307, 224, 247, 225, 185 S; 273/143 A, 273/142 R, 138.1, 139, 280, 281, 282.1; 345/82, 345/88, 110, 108
See application file for complete search history.

(56) References Cited

U.S. PATENT DOCUMENTS 4,858,141 A    8/1989   Hart et al.
(Continued)

FOREIGN PATENT DOCUMENTS

JP   2001-307505 A   11/2001
JP   2006-525640 A   11/2006
(Continued)

OTHER PUBLICATIONS

Hart, G. W., Nonintrusive appliance load monitoring, Porceedings of the IEEE, vol. 80, No. 12, Dec. 1, 1992, pp. 1870-1891, IEEE, New York, NY, US.

(Continued)

*Primary Examiner* — Tuyet Thi Vo
(74) *Attorney, Agent, or Firm* — Bruce A. Young

(57) ABSTRACT

A networked light bulb is disclosed comprising means for controlling a state of the networked light bulb, means for connecting to a network, means for allowing a user to select a color from a plurality of colors, the plurality of colors having at least one locking color and one or more non-locking colors, and means for generating a selected color code corresponding to the color selected by the user, each color of the plurality of colors having a corresponding color code. If the user selects the locking color, the networked light bulb disconnects from the network and turns the light bulb on. If the user selects a non-locking color, the networked light bulb submits the selected color code over the network for use by the network controller in configuring the device and changes the state of the networked light bulb in response to a command from the network. In some embodiments the networked light bulb also responds to requests for status information from the network independent of the color selected by the user. In some embodiments that means for controlling the networked light bulb controls the brightness of the light.

17 Claims, 7 Drawing Sheets

U.S. PATENT DOCUMENTS

| | | | |
|---|---|---|---|
| 4,918,690 A | 4/1990 | Markkula et al. |
| 5,258,656 A | 11/1993 | Pawlick |
| 5,301,122 A | 4/1994 | Halpern |
| 5,483,153 A | 1/1996 | Leeb et al. |
| 5,519,878 A | 5/1996 | Dolin |
| 5,650,771 A | 7/1997 | Lee |
| 5,717,325 A | 2/1998 | Leeb et al. |
| 5,754,963 A | 5/1998 | Nunneley et al. |
| 6,160,551 A | 12/2000 | Naughton et al. |
| 6,476,729 B1 | 11/2002 | Liu |
| 6,492,897 B1 | 12/2002 | Mowery |
| 6,501,463 B1 | 12/2002 | Dahley et al. |
| 6,528,954 B1 | 3/2003 | Lys et al. |
| 6,987,444 B2 | 1/2006 | Bub et al. |
| 6,993,417 B2 | 1/2006 | Osann, Jr. |
| 7,014,336 B1 | 3/2006 | Ducharme et al. |
| 7,355,523 B2 | 4/2008 | Sid |
| 7,579,711 B2 | 8/2009 | Menas et al. |
| 7,651,245 B2 | 1/2010 | Thomas et al. |
| 7,772,718 B2 | 8/2010 | Lee et al. |
| 7,844,353 B2 | 11/2010 | Dejean et al. |
| 7,876,255 B2 | 1/2011 | Conway et al. |
| 7,885,917 B2 | 2/2011 | Kuhns et al. |
| 7,956,546 B2 | 6/2011 | Hasnain |
| 7,961,111 B2 | 6/2011 | Tinaphong et al. |
| 7,970,542 B2 | 6/2011 | Bent et al. |
| 8,013,545 B2 | 9/2011 | Jonsson |
| 2002/0152045 A1 | 10/2002 | Dowling et al. |
| 2003/0025840 A1 | 2/2003 | Arling |
| 2003/0050737 A1 | 3/2003 | Osann |
| 2003/0197772 A1 | 10/2003 | Iwatsuki et al. |
| 2004/0066652 A1 | 4/2004 | Hong |
| 2005/0231134 A1 | 10/2005 | Sid |
| 2006/0202557 A1 | 9/2006 | Menas et al. |
| 2006/0271544 A1 | 11/2006 | Devarakonda et al. |
| 2006/0284734 A1 | 12/2006 | Newman |
| 2007/0135973 A1 | 6/2007 | Petite |
| 2007/0297112 A1 | 12/2007 | Gilbert |
| 2008/0094210 A1 | 4/2008 | Paradiso et al. |
| 2008/0201268 A1 | 8/2008 | Duncan |
| 2008/0270937 A1 | 10/2008 | Poulet et al. |
| 2009/0059603 A1 | 3/2009 | Recker et al. |
| 2009/0202250 A1 | 8/2009 | Dizechi et al. |
| 2009/0234512 A1 | 9/2009 | Ewing et al. |
| 2009/0236909 A1 | 9/2009 | Aldag et al. |
| 2009/0237006 A1 | 9/2009 | Champion et al. |
| 2009/0254909 A1 | 10/2009 | Hanson et al. |
| 2009/0267540 A1 | 10/2009 | Chemel et al. |
| 2009/0322159 A1 | 12/2009 | DuBose et al. |
| 2010/0005331 A1 | 1/2010 | Somasundaram et al. |
| 2010/0084992 A1 | 4/2010 | Valois et al. |
| 2010/0090542 A1 | 4/2010 | Johnson et al. |
| 2010/0141153 A1 | 6/2010 | Recker et al. |
| 2010/0145542 A1 | 6/2010 | Chapel et al. |
| 2010/0191487 A1 | 7/2010 | Rada et al. |
| 2011/0031819 A1 | 2/2011 | Gunwall |
| 2011/0062874 A1 | 3/2011 | Knapp |
| 2011/0098867 A1 | 4/2011 | Jonsson et al. |
| 2011/0248640 A1 | 10/2011 | Welton |
| 2011/0309735 A1 | 12/2011 | Parker et al. |
| 2012/0126699 A1 | 5/2012 | Zittel et al. |

FOREIGN PATENT DOCUMENTS

| | | |
|---|---|---|
| JP | 2008-123727 A | 5/2008 |
| KR | 10-2002-0034855 A | 5/2002 |
| WO | 03-026358 A1 | 3/2003 |
| WO | 03026358 A1 | 3/2003 |
| WO | 03/077100 A1 | 9/2003 |
| WO | 2005/039144 A1 | 4/2005 |
| WO | 2009084016 A2 | 7/2009 |
| WO | 2009097400 A1 | 8/2009 |

OTHER PUBLICATIONS

Fujikpm's LED business, World Wide Web site http://www.fujikom.com/en/products/led/.

Notice of Allowance for U.S. Appl. No. 12/795,629, USPTO, Mar. 29, 2012.

Notice of Allowance for U.S. Appl. No. 12/795,629, USPTO, Apr. 18, 2012.

Non-Final Office Action for U.S. Appl. No. 13/195,655, USPTO, Jun. 21, 2011.

W. Diehl, "Home Automation Group Selection by Color," GWRPID-005, Unpublished U.S. Appl. No. 12/795,381, filed Jun. 7, 2010.

"Lamp Module Receiver PLM03 User Manual," X10, Inc. 2008, http://www.x10pro.com/pro/pdf/plm03.pdf retrieved on May 25, 2010.

K. Jonsson, "Modular Networked Light Bulb," GWRPID-002A, Unpublished U.S. Appl. No. 12/795,395, filed Jun. 7, 2010.

K. Jonsson, "Networked Device with Power Usage Estimation," GWRPID-002C, Unpublished U.S. Appl. No. 12/795,417, filed Jun. 7, 2010.

K. Jonsson, "Automated Load Assessment Device and Method," GWRPID-001A, Unpublished U.S. Appl. No. 12/795,629, filed Jun. 7, 2010.

K. Jonsson, "Power Node for Energy Management," GWRPID-006, Unpublished U.S. Appl. No. 12/777,229, filed May 10, 2010.

International Search Report and Written Opinion of the International Searching Authority for PCT/US2010/053355, Sep. 1, 2001.

Philogene, Haissa, U.S. Appl. No. 12/795,395 Notice of Allowance, Jul. 22, 2011, USPTO.

A. Pudenzi, A Neuron Nets Based Procedure for Identifying Domestic Appliances Pattern of Use from Energy Recordings at Meter Panel, IEEE, 2002.

Non-Final Office Action for U.S. Appl. No. 12/795,629, USPTO, Oct. 24, 2011.

Notice of Allowance for U.S. Appl. No. 12/795,395, USPTO, Jul. 22, 2011.

Notice of Allowance for U.S. Appl. No. 12/777,229, USPTO, Nov. 26, 2011.

Non-Final Office Action for U.S. Appl. No. 12/795,417, USPTO, Aug. 28, 2012.

Notice of Allowance for U.S. Appl. No. 12/795,381, USPTO, Sep. 17, 2012.

Notice of Allowance for U.S. Appl. No. 13/195,655 United States Patent and Trademark Office, Dec. 17, 2012.

Notice of Allowance for U.S. Appl. No. 12/795,417, United States Patent and Trademark Office, Jan. 14, 2013.

Notice of Allowance for U.S. Appl. No. 12/883,596, United States Patent and Trademark Office, Dec. 13, 2012.

NETWORKED LIGHT BULB WITH COLOR WHEEL FOR CONFIGURATION

CROSS-REFERENCE TO RELATED APPLICATIONS

This application claims the benefit of U.S. Provisional patent application Ser. No. 61/254,709 entitled "HYBRID LIGHT" and filed on Oct. 25, 2009, the entire contents of which is hereby incorporated by reference.

Background

1. Technical Field

The present subject matter relates to home automation networking. It further relates to initialization and setup of networked home automation devices.

2. Description of Related Art

Providing home automation functionality using networking means is well known in the art. Control of lighting and appliances can be accomplished using systems from many different companies such as X10, Insteon® and Echelon. These systems all require some kind of initialization and setup of the devices to communicate properly on the network. In some cases some of the initialization and setup is pre-defined in the device with no mechanism for the user to easily configure the device for their particular installation. But in many cases, a way for the user to configure the device at the time of installation is required. Light bulbs and light fixtures create a special challenge in that they are often installed in locations that can be hard to reach and people are not used to touching a light bulb, especially when it is on and could be quite hot.

US Pat. App. No. 2009/0237006 filed Mar. 18, 2008 by inventors Champion et al. shows a method and apparatus for identifying a group of devices where a controller receives a color identifying value over a communication channel from a management network and then combines the light emitted by the at least two LEDs into an identifying color that identifies a group of devices. In U.S. Pat. No. 4,918,690 issues on Apr. 17, 1990, the inventors Markkula et al. describe a network for sensing, communicating and controlling where each cell in the network is assigned a group identification number.

Inventor Dolin describes an apparatus and method for network node identification and network configuration in U.S. Pat. No. 5,519,878 issued on May 21, 1996. In Dolin's system, each device in the home automation network contains a unique ID that is obtained at the time of installation and then placed on a machine readable medium such as a bar code sticker. The bar code stickers for each device are then placed on paper floor plan to show the physical location of that device. The paper floor plan with the stickers is then read by an automatic configuration device to determine the physical location of each device for future use.

However, neither Champion et al., Markkula et al. nor Dolin address the ability of a user to set the network group or other parameters using a control mechanism on the device itself.

In US Pat. App. No. 2009/0267540, inventors Chemel at al. show an intelligent LED lighting system with mesh networking connectivity. Chemel et al. describe a power management module (PMM) with light module identification. Each light module may have identifying information programmed into it, and can communicate that information to the PMM, which can in turn store and communicate that information to a user or installer to aid in replacement or commissioning. The information may be stored in a nonvolatile memory onboard the light module, and communicated via a digital bus to the PMM. The information may be stored passively on the light module, such as via a series of jumpers or dip switches, and can be read by the PMM. The passive storage may include electrical contacts with encoded bit pattern stored in an optics holder. The passive storage may include passive RFID.

X10 markets a series of home automation control modules such as the PLM03 Lamp Module Receiver. Many X10 modules include two rotary control dials that the user can set at installation to allow each separate module to be independently controlled. One dial is for the "House Code" and can be set to a letter ranging from "A" to "P" while the other dial is for the "Unit Number" which can be set to a number ranging from 1 to 16.

It should be noted that neither the system described by Chemel et al. nor X10 devices address simplifying the way that the user can identify the location or other parameters of a device.

It therefore is important to provide a new method for the user to very easily configure a networked device for the home. The method should be very easy to remember and provide a simple means to configure at least the location or other basic parameter important to the networking of the device. It should also take the unique features of a light bulb or light fixture into account.

SUMMARY

Various embodiments of the present subject matter disclose methods and apparatus for configuring a networked lighting apparatus such as light bulb or light fixture. One embodiment of a method for configuring a networked lighting apparatus generates a selected color code corresponding to a color selected from a plurality of colors, the plurality of colors having at least one locking color and one or more non-locking colors and each color of the plurality of colors having a corresponding color code. It disables a network connection if the color selected is the at least one locking color. Only if the color selected is one of the one or more non-locking colors, it connects to the network, sends the selected color code over the network, and changes a state of the networked lighting apparatus in response to a message received over the network. In some embodiments the state of the networked lighting apparatus being changed is a brightness level of the networked lighting apparatus and in some embodiments the brightness level may be limited to On and Off. Some embodiments may set the brightness level of the networked lighting apparatus to at least 10% of maximum if the color selected is the at least one locking color and some embodiments may respond to a request for status information from the network only if the color selected is one of the one or more non-locking colors. One embodiment also receives a local control action and changes the state of the networked lighting apparatus in response to the local control action only if the color selected is one of the one or more non-locking colors.

One embodiment includes means for powering a light emitting device, means for controlling a brightness level of the light emitting device, means for connecting to a network, means for allowing a user to select a color from a plurality of colors, the plurality of colors having at least one locking color and one or more non-locking colors, and means for generating a selected color code corresponding to the color selected by the user, each color of the plurality of colors having a corresponding color code. The means for connecting to the network submits the selected color code over the network only if the color selected by the user is one of the one or more non-locking colors and the means for controlling the brightness level of the light emitting device changes brightness level in response to a message from the network only if the color selected by the user is one of the one or more non-locking colors. In some embodiments, the brightness level is limited to On and Off. Some embodiments respond to a request for status information from the network only if the color selected by the user is one of the one or more non-locking colors. Some embodiments also include means for allowing the user enter a local brightness command but the means for controlling the brightness level of the light emitting device changes the brightness level in response to the local brightness command only if the color selected by the user is one of the one or more non-locking colors.

One embodiment of a networked light bulb comprises a light emitting apparatus, a controller, a network adapter communicatively coupled to the controller, and a color selection mechanism communicatively coupled to the controller, the color selection mechanism allowing a user to select a color from a plurality of colors, the plurality of colors having at least one locking color and one or more non-locking colors. The color selection mechanism communicates information corresponding to the color selected by the user to the controller and if the color selected by the user is the at least one locking color, the controller disables the network adapter. If the color selected by the user is one of the one or more non-locking colors, the controller converts the information communicated by the color selection mechanism to a color code corresponding to the color selected by the user, the controller communicates the color code to the network adapter, the network adapter sends the color code out over the network, the network adapter receives a message from the network to change a state of the networked light bulb and communicates it to the controller, and the controller changes the state of the networked light bulb in response to the message to change the state of the network light bulb communicated by the network adapter. In some embodiments, the network adapter connects to a wireless network such as Wi-Fi, Z-wave or Zigbee and in some instances the controller and the network adapter may be integrated on a single integrated circuit. In some embodiments the state of the networked light bulb being changed is a brightness level of the light emitting apparatus and it may be limited to On and Off. In some embodiments, the network adapter receives a status request message from the network and communicates it to the controller only if the color selected by the user is one of the one or more non-locking colors and the controller responds to the status request message communicated by the network adapter by communicating a response message to the network adapter to send out over the network.

In at least one embodiment, the color selection mechanism comprises a rotary switch with a rotatable shaft and an output communicatively coupled to the controller and a color wheel having a center, an edge and a colored area, the center of the color wheel coupled to the shaft of the rotary switch and the colored area divided into sections, each section imprinted with a section color selected from the plurality of colors. As the color wheel is rotated by user manipulation of the edge, the colored area of the color wheel and the rotatable shaft of the rotary switch also rotate and the output of the rotary switch communicates current rotational position information corresponding to the color selected by the user to the controller. In at least one embodiments, the color selection mechanism also has a selection mark in close physical proximity to the section of the colored area of the color wheel imprinted with the section color corresponding to the color selected by the user at the current rotational position. And in some embodiments, the networked light bulb further has an outer housing with an aperture. The color wheel is mounted in the networked light bulb so that a portion of the edge of the color wheel protrudes from the outer housing of the networked light bulb, whereby the user is able to manipulate the edge to rotate the color wheel about its center. A portion of the colored area is visible through the aperture in the outer housing of the networked light bulb with a majority of the portion of the colored area visible through the aperture in the outer housing of the networked light bulb is the section of the colored area imprinted with the section color corresponding to the color code selected by the user at the current rotational position. And in some embodiments the color wheel may also include visible or tactilely recognizable symbols.

BRIEF DESCRIPTION OF THE DRAWINGS

The accompanying drawings, which are incorporated in and constitute part of the specification, illustrate various embodiments of the invention. Together with the general description, the drawings serve to explain the principles of the invention. In the drawings.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures and components have been described at a relatively high-level, without detail, in order to avoid unnecessarily obscuring aspects of the present concepts. A number of descriptive terms and phrases are used in describing the various embodiments of this disclosure. These descriptive terms and phrases are used to convey a generally agreed upon meaning to those skilled in the art unless a different definition is given in this specification. Some descriptive terms and phrases are presented in the following paragraphs for clarity.

The term "LED" refers to a diode that emits light, whether visible, ultraviolet, or infrared, and whether coherent or incoherent. The term as used herein includes incoherent polymer-encased semiconductor devices marketed as "LEDs", whether of the conventional or super-radiant variety. The term as used herein also includes semiconductor laser diodes and diodes that are not polymer-encased. It also includes LEDs that include a phosphor or nanocrystals to change their spectral output.

The term "network" refers to a bidirectional communication medium and protocol to allow a plurality of devices to communicate with each other.

The term "networked device" refers to any device that can communicate over a network.

The terms "networked light fixture", "networked lighting apparatus" and "networked light bulb" all refer to a networked device capable of emitting light. While there are subtle differences in the generally agreed upon embodiments for these terms, they may be used interchangeably in this disclosure unless additional detail is provided to indicate that a specific embodiment is being discussed.

Reference now is made in detail to the examples illustrated in the accompanying drawings and discussed below.

Figure 1:
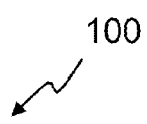
FIG. 1 shows a table of color definitions used in this disclosure.

FIG. 1 is a table 100 indicating some embodiments of the colors that could be used with the subject of the present disclosure. The first column 101 contains reference numbers 0-9 to be used for referring to each color. Some embodiments may use fewer than 10 colors while others may use more than 10 colors. The second column 102 contains symbols that may optionally be imprinted on top of the color to help people who may have difficulty distinguishing between different colors. In this embodiment, the first color has no symbol, the next 8 colors use an Arabic numeral as the symbol, and the final symbol is a padlock. Other visible symbols may be used in other embodiments. Tactilely recognizable symbols such as Braille may be used in other embodiments. The third column 103 contains the color names for the colors of this embodiment. Other colors could be used in other embodiments. The next four columns 104, entitled "Print Colors", give one possible set of colors to be mixed for 4-color printing processes. The four columns 104 represent the percentage of the maximum amount of ink for the cyan (C%), magenta (M%), yellow (Y%), and black (K%) and can range from 0% to 100%. Other mixes might be used for some embodiments depending on the specific inks, print stock and exact desired color. The next three columns 105, entitled "Computer Colors", give a possible representation for the indicated colors for use on a computer screen. The three columns 105 represent a color value for each of red (R), green (G) and blue (B) and range from 0 to 255 to allow the value for each component color to be stored in a single 8 bit storage location as is common in computer systems. The final (right-most) column 106, entitled "Fill", gives a cross-hatch pattern that is used in the following black and white figures to indicate the color that would fill a particular area.

Figure 2:
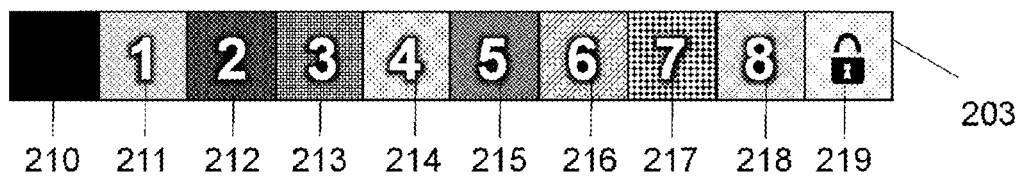
FIG. 2 shows an embodiment of a color wheel.
Figure 2:
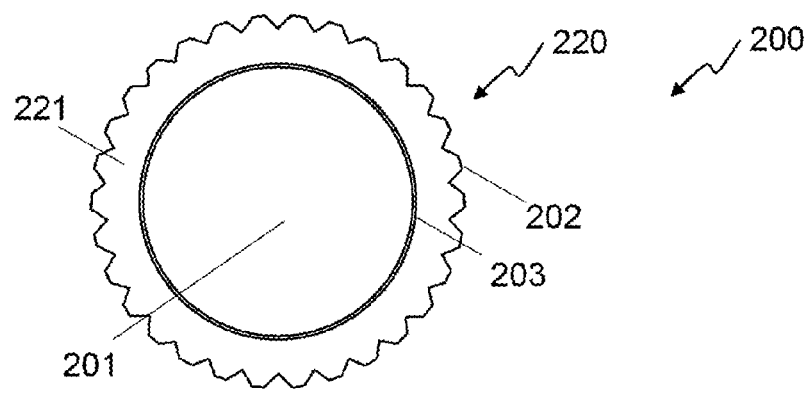
Figure 2:
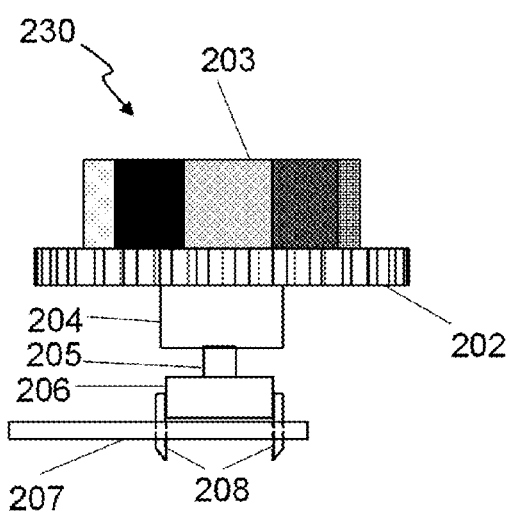

FIG. 2 shows one particular embodiment of a color selection mechanism 200 to allow a user to select a color. Top view 220 shows a color wheel 221 from the top and side view 230 shows the color wheel 221 from the side with some associated structure that has been omitted from the top view 220 for clarity. The color wheel mechanism 200 has a color wheel with a raised disc 201, an edge 202 extending out beyond the raised disc, and a hub 204. In some embodiments, the hub may not extend below the edge plane. The edge 202 may be knurled or textured to give better grip as it is rotated by the user. A colored area 203 is included on the color wheel. In this embodiment, the colored area 203 is implemented as a label that is wrapped around the raised disc 201 and attached with adhesive. The colored area 203 is divided into sections 210-219, each section imprinted with a different color as defined in FIG. 1. In this embodiment, section 210 is imprinted with color 0 and no identifying symbol. In this embodiment, color 0 is black. Section 211 is imprinted with color 1 and the symbol "1". Section 212 is imprinted with color 2 and the symbol "2". Section 213 is imprinted with color 3 and the symbol "3". Section 214 is imprinted with color 4 and the symbol "4". Section 215 is imprinted with color 5 and the symbol "5". Section 216 is imprinted with color 6 and the symbol "6". Section 217 is imprinted with color 7 and the symbol "7". Section 218 is imprinted with color 8 and the symbol "8". Section 219 is imprinted with color 9 and the symbol of a padlock to symbolize that this is the locking color. In this embodiment color 9 is white. The colors imprinted on the colored area 203 represent nine non-locking colors 0-8 and one locking color 9 which is white. Other embodiments may use more or less than ten colors. The color wheel hub 204 is attached to the shaft 205 of a rotary dip switch 206 that may be mounted on a printed circuit board 207. As the color wheel 221 is turned, it turns the shaft 205 of the rotary dip switch 206 which generates information depending on the rotational angle of the shaft 205. The information is then available on the pins 208 (not all pins are shown) of the rotary dip switch 206. The pins 208 may be connected to pull-up resistors and a controller located on the same printed circuit board (or elsewhere in the networked light bulb). In one embodiment the rotary dip switch is a BCD encoder that generates 4 bits of output that can either be connected to ground or left as an open circuit so that as each output is connected to a pull-up resistor, the output represents a binary number between 0000 and 1010. Other methods of encoding the angular position of the color wheel 221 could also be used such as independent switches for each position, an optical shaft encoder, a magnetic detector, two-axis hall-effect sensors or other well-known methods of detecting the angular position of a disk or shaft.

Figures 3A, 3B:
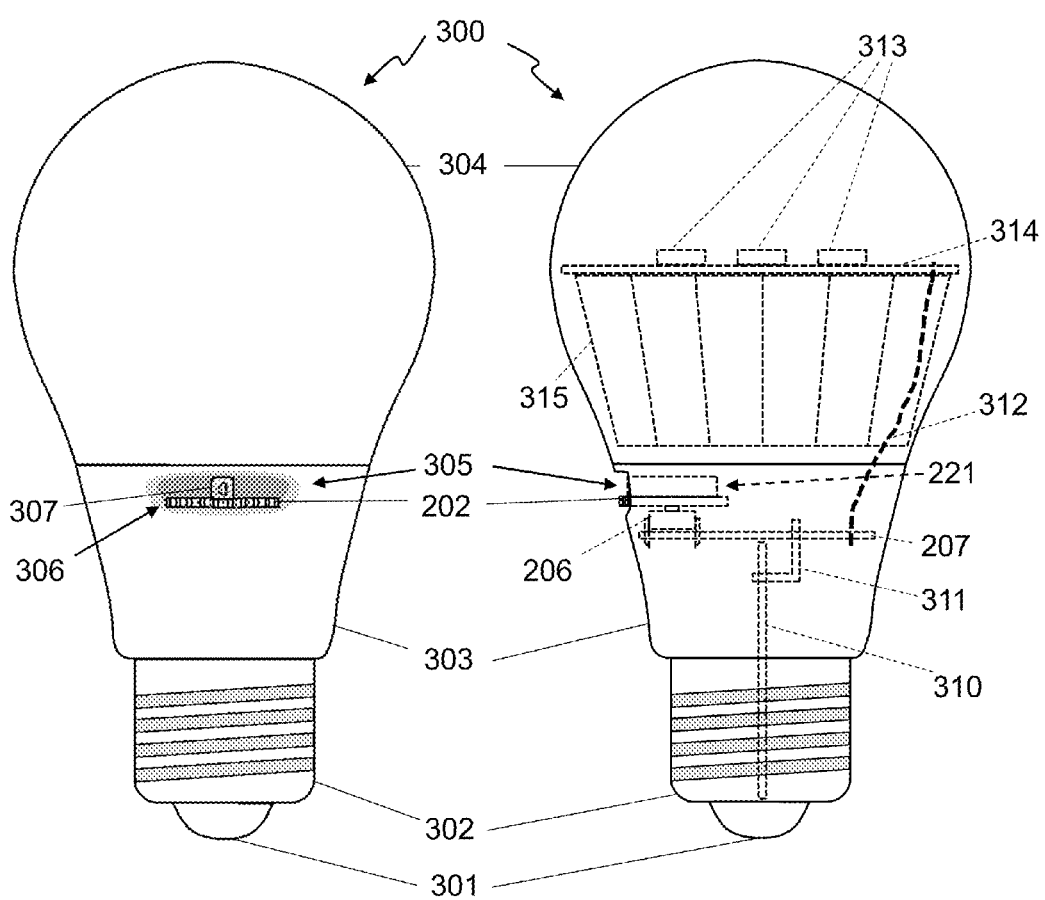
FIG. 3 shows a networked light bulb with a color wheel for configuration.

FIG. 3A shows a front view (with inner structure not shown) and FIG. 3B shows a side view (with selected inner structure shown in broken lines) of the color selection mechanism 200 implemented in a networked light bulb 300. In this embodiment a networked light bulb 300 is shown but other embodiments of the present subject matter could be a permanently installed light fixture with a socket for a standard light bulb, or a light fixture with embedded LEDs or any other sort of light emitting apparatus. The light bulb 300 is AC powered but other embodiments could be battery powered or solar powered. The networked light bulb 300 of this embodiment has a base with a power contact 301 and a neutral contact 302, a middle housing 303 and an outer bulb 304. Each section 301, 302, 303, 304 can be made of a single piece of material or be assembled from multiple component pieces. The outer bulb 304 is at least partially transparent and may have ventilation openings in some embodiments, but the other sections 301, 302, 303 can be any color or transparency and be made from any suitable material. The middle housing 303 has an indentation 305 with a slot 306 and an aperture 307. The color wheel 221 is attached to the shaft of rotary switch 206 which is mounted on a printed circuit board 207. The printed circuit board 207 with the color wheel 221 is mounted horizontally so that the edge 202 of the color wheel protrudes through the slot 306 of the middle housing 303. This allows the user to apply a rotational force to the color wheel 221. As the color wheel 221 rotates, different sections of the colored area 203 of the color wheel 221 are visible through an aperture 307. In FIG. 3, the current position of the color wheel 221 is such the color section with color 4 is visible through the aperture 307, indicating that the user has selected color 4 at this time. The color selection mechanism 200 may be designed to provide a detent at each section of the colored area 203 to make it clear what color is currently selected.

In this embodiment, a second printed circuit board 310 is mounted vertically in the base of the networked light bulb 300. A board-to-board connection 311 is provided to connect selected electrical signals between the two printed circuit boards 207, 310. A third printed circuit board 314 has a plurality of LEDs 313 mounted on it and is backed by a heat sink 315 to cool the plurality of LEDs 313. In some embodiments the third printed circuit board 314 with a plurality of LEDs 313 may be replaced by a single multi-die LED package or a single high output LED. In some embodiments the heat sink 315 may not be needed or could be a completely different configuration than what is shown. A cable 312 connects the printed circuit board 207 with the third printed circuit board 314. The cable 312 carries the power for the plurality of LEDs 313. In some embodiments it may be connect the second printed circuit board 310 directly to the third printed circuit board 314 instead of passing the signals through the printed circuit board 207.

Figure 4:
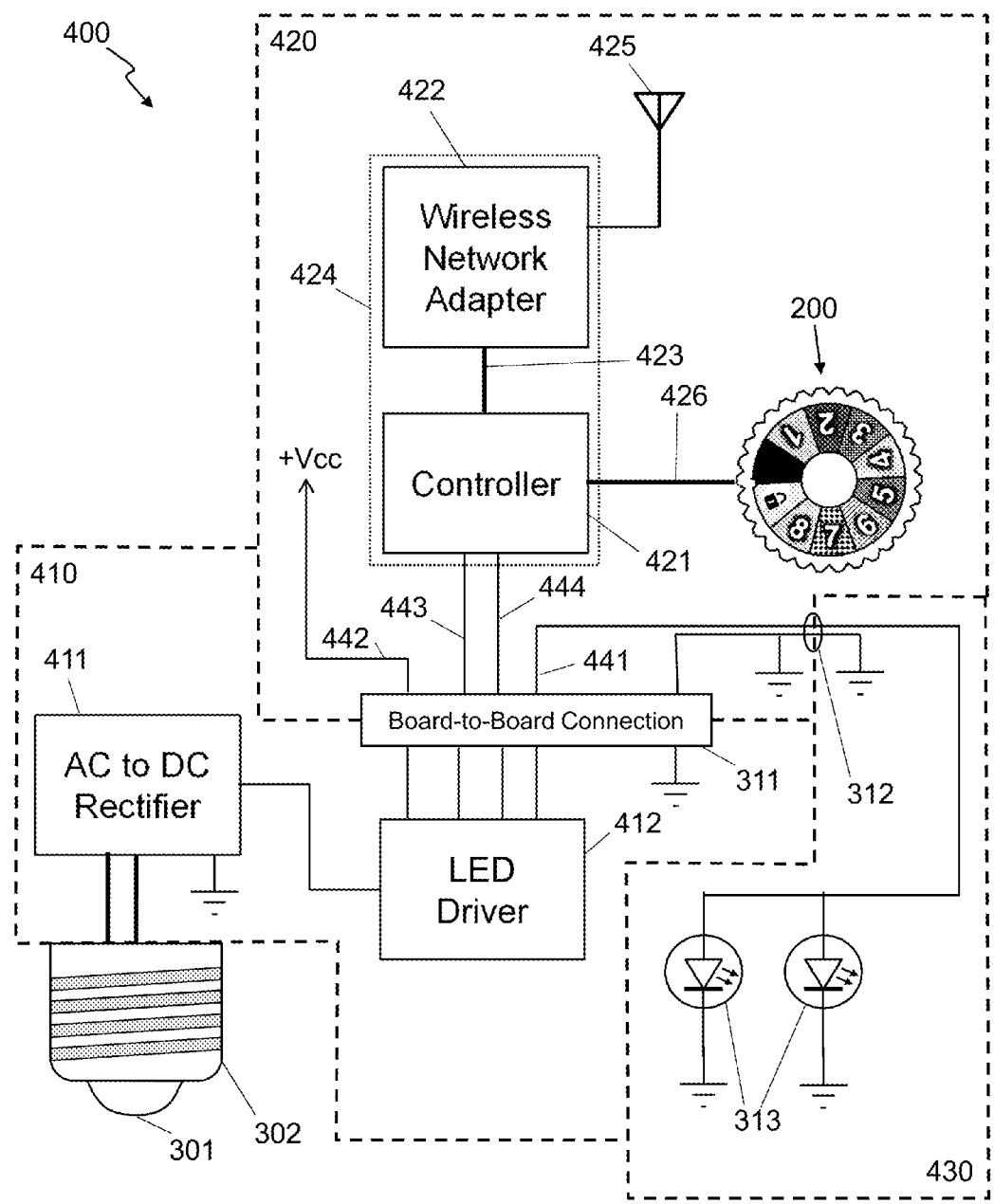
FIG. 4 shows a block diagram of the electronics utilized in one embodiment of the networked light bulb.

FIG. 4 shows a block diagram of the control electronics 400 used in the networked light bulb 300. The block diagram is divided into three sections 410, 420, 430 corresponding to the three printed circuit boards of FIG. 3. Other embodiments may partition the system differently and have more or fewer printed circuit boards or circuit elements. The three sections are the LED Driver section 410, corresponding to the second printed circuit board 310, the networked controller section 420, corresponding to the printed circuit board 207, and the LED section 430, corresponding to the third printed circuit board 314, The base with contacts 301, 302 provides AC power to the AC to DC rectifier 411 to power the LED driver 412. The LED driver may be an integrated circuit such as the NXP SSL2101 or similar parts from Texas Instruments or others. Several signals are shared in common between the LED driver section 410 and the networked controller section 420 through a board-to-board connection 311. The board-to-board connection 311 may be a pin and socket connector system, an edge finger connector system, soldered right angle pins, a cable, or any other method of connecting two boards. The shared signals comprise a ground connection, the LED power signal 441, a regulated power voltage 442, a control signal 443 and a serial communication signal 444. In some embodiments, the regulated power voltage 442 may be sufficient to power all the electronics in the networked controller section 420. In other embodiments, where more power is needed, a DC to DC converter may be included in the networked controller section 420 running off the LED power signal 441. The ground signal and the LED power signal 441 are then sent from the networked controller section 420 to the LED section 430 over cable 312. The LED section 430 may have a plurality of LEDs 313 powered by the LED power signal 441.

The networked controller section 420 has a wireless network adapter 422 that receives radio frequency signals through antenna 425 and is connected to controller 421 by a digital bus 423. In some embodiments, the wireless network adapter 422 may connect to a Z-wave, Zigbee (IEEE 802.15.4) or Wi-Fi (IEEE 802.11) wireless network. Other embodiments may use a wired or power line network adapter instead of a wireless network adapter. In some embodiments, the controller 421 is implemented as a microcontroller and in some embodiments, the controller 421, wireless network adapter 422, and digital bus 423 may be integrated onto a single chip 424 such as the Zensys ZM3102. A color selection mechanism 200 is also connected to the controller 421 providing rotational position information through an electrical connection 426. In other embodiments color selection mechanism may be provided using other means such as a graphical user interface on a display or a keypad or buttons or any other device or combination of devices that allows the user to select a color and provide information on the color chosen to the controller 421.

In some embodiments, the controller 421 controls the brightness of the plurality of LEDs 313 by driving the control signal 443 back to the LED driver 412. In one embodiment the controller 421 may simply drive the control signal 443 low to turn the plurality of LEDs 313 on and drive the control signal 443 high to turn the plurality of LEDs 313 off. In other embodiments, the controller 421 may drive the control signal 443 with a pulse-width modulated signal to control the brightness of the plurality of LEDS 313. In some embodiments, the LED driver section 410 is designed to accept power that has been controlled by a standard thyristor-based light dimmer which varies the phase where the AC power is active. This can interact with the dimming control taking place over the network. To determine the current dimming level of the LEDs 313, the networked controller section 420 may, in some embodiments, include circuitry to monitor the LED power signal 441 to determine the amount of dimming taking place. In other embodiments, the controller 421 may communicate with the LED driver 412 over the serial communications signal 444 to query and perhaps override the current dimming level. The serial communication signal 444 may also be used to communicate actual power used, color temperature control, device temperature information or any other status or control information that might need to be communicated between the controller 421 and the LED driver 412 in a particular embodiment. The serial communication signal 444 may be implemented with a unidirectional or a bidirectional communication protocol such as RS-232, I2C, USB, SPI or any other standard or proprietary protocol.

Figure 5:
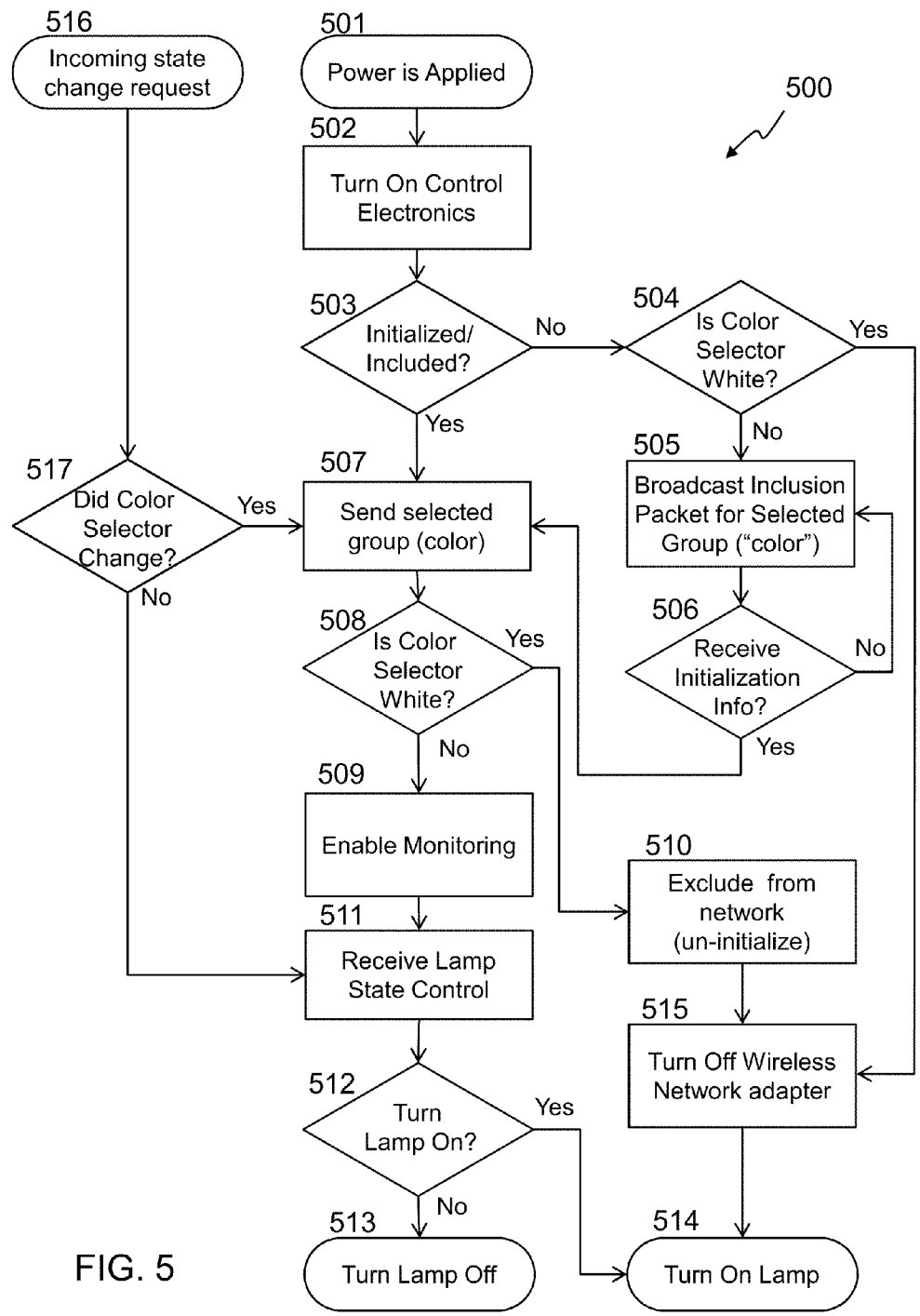
FIG. 5 is a flowchart describing how the color selection means is used in the configuration of a networked light bulb.

FIG. 5 shows a flow chart 500 for the operation of the networked light bulb 300 of the current subject matter. The exact order of operations and details shown in this flow chart 500 may differ between embodiments but one skilled in the art can see how the concepts presented herein would still apply. After power is applied 501, the networked light bulb 300 turns the control electronics 400 on 512. The controller 421 then checks 503 to see if the light bulb has been previously initialized and included into the network. If the device has not yet been initialized and included into the network, it checks 504 to see if the currently selected color is white (the locking color). If the currently selected color is white, the controller 421 turns off 515 the wireless network adapter 422 and then turns on 514 the LEDs 313 by driving the control signal 443 low.

If the color selected is not white, the controller 421 broadcasts 505 an inclusion packet over the network to let a network controller know that there is a new device on the network that needs to be initialized and configured. The controller 421 then waits for some period of time to receive 506 initialization information from the network controller. If no initialization information is received, the controller rebroadcasts 505 an inclusion packet and waits again, repeating this process until initialization information is received 506. Once initialization information has been received, the controller 421 gets the color information the color selection mechanism 200, converts it to the corresponding color code, and sends 507 the color code out to the network controller. The network controller uses the color code to help further configure the device and create a more user-friendly user interface for the entire network. One way the network controller may use the color code is to allow the user to assign a particular color to a room and set all the networked devices located in that room to the same color. An alternative use is to differentiate all similar devices using a different color so that the user can easily tell which device is which, as they interact with the network controller. In yet another use, the color can be used to group devices together that interact, such as all the audio-visual devices. The way that the color information is used by the network controller or other network devices is dependent on the implementation of the entire home automation system and may be invisible to the networked light bulb.

After the color code has been transmitted 507, the controller 421 then determines 508 if the color selected is the locking color, white, in case the color selected has changed. If the locking color white has been selected, the controller 421 excludes 510 the networked light bulb 300 from the network, gracefully disconnecting from any services and in some embodiments, informing the network controller that it is dropping off the network. It also may remove network initialization information. It then turns off 515 the wireless network adapter, in some embodiments removing power from that device and in others just disabling its function. In some embodiments, the controller may also ignore all local control requests such as when the user presses a local power button or changes a local dimming control on the networked light bulb 300 if the locking color has been selected.

If the color selected on the color selection mechanism 200 is not white, in some embodiments the controller 421 may enable monitoring 509 of the status of the light bulb. A networked light bulb 300 may allow the network controller or other network devices to query its current brightness state, current power usage, current physical temperature of various components, the color temperature of the output of the plurality of LEDs 313, diagnostic information or other information available to the networked light bulb that other devices on the network might find useful. The controller 421 then is enabled 511 to receive control messages over the network. If the control message tells the controller 421 to turn the device On 512, the controller 421 drives the control signal low to turn on 514 the plurality of LEDs 313. If the control packet tells the controller 421 to turn the device Off 512, the controller 421 drives the control signal high to turn off 513 the plurality of LEDs 313. Depending on the particular embodiment, many states other than the On/Off state may be controlled such as the brightness or the color temperature of the plurality of LEDs 313. On occasion, new incoming state change requests may be received 516. Those state change requests may come over the network or they may be received from a local user interface on the device such as changing the color selected. Whenever a new state change request is received 516, the controller 421 checks to see if the color selected by the user on the color selection device 200 has changed 517. In some embodiments, the act of changing the color may generate a state change request. If the color has changed 517, the controller 421 sends 507 the new color out over the network to let the network controller know that the user has changed the color code on the device. The controller then proceeds through the same set of steps 508-515 as described in the initial power-up sequence. If the color has not changed 517, there is no need to rebroadcast the color code or recheck to see if the color is white, so the controller simply receives the control message 511 and takes appropriate action 512-514.

Figures 6A, 6B:
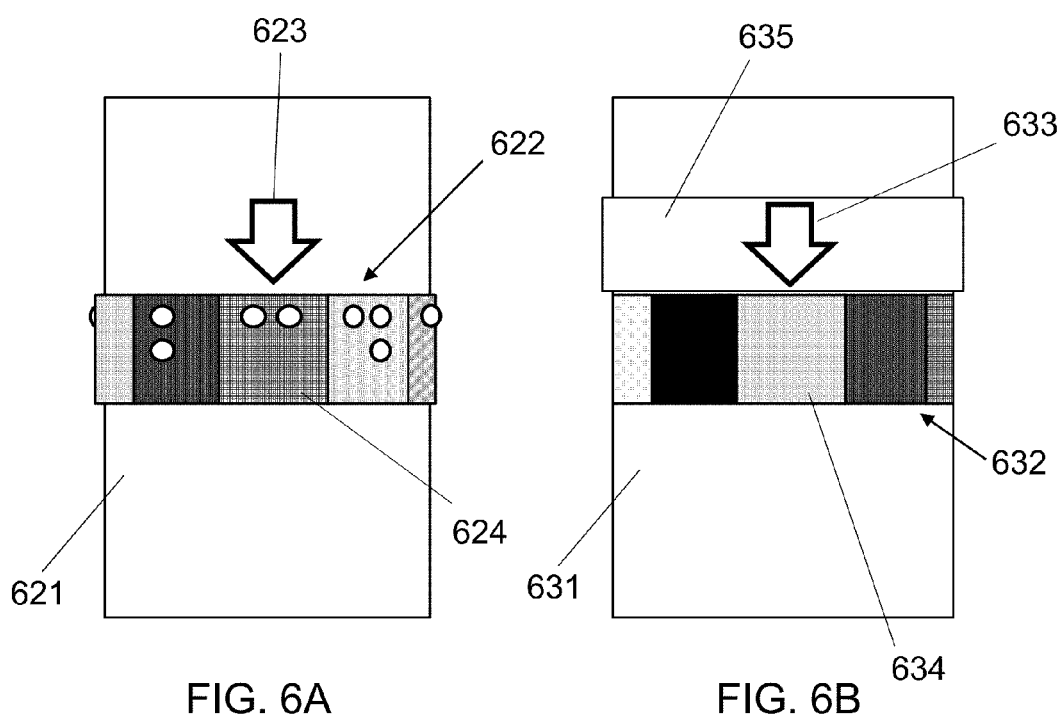
FIG. 6A and 6B show additional embodiments of color selection mechanism.

FIG. 6A and 6B show additional alternative embodiments of a color selection mechanism. FIG. 6A shows a cylindrical portion 621 of the networked light bulb. Rotating color sleeve 622 can be rotated about the cylindrical element 621. Selection indicator 623 points at the currently selected color on the rotating color sleeve 622. The currently selected color in FIG. 6A is color "3", the color of section 624. FIG. 6B also shows a cylindrical portion 631 of a networked light bulb. Rotating selector sleeve 635 with a selector indicator 633 can be rotated about the cylindrical element 631. Fixed color ring 632 is affixed to the cylindrical element 631 adjacent to the rotating selector sleeve 635. Selection indicator 633 points at the currently selected color on the fixed color sleeve 632. In FIG. 6B the currently selected color is color "1", the color of section 634.

Figure 7:
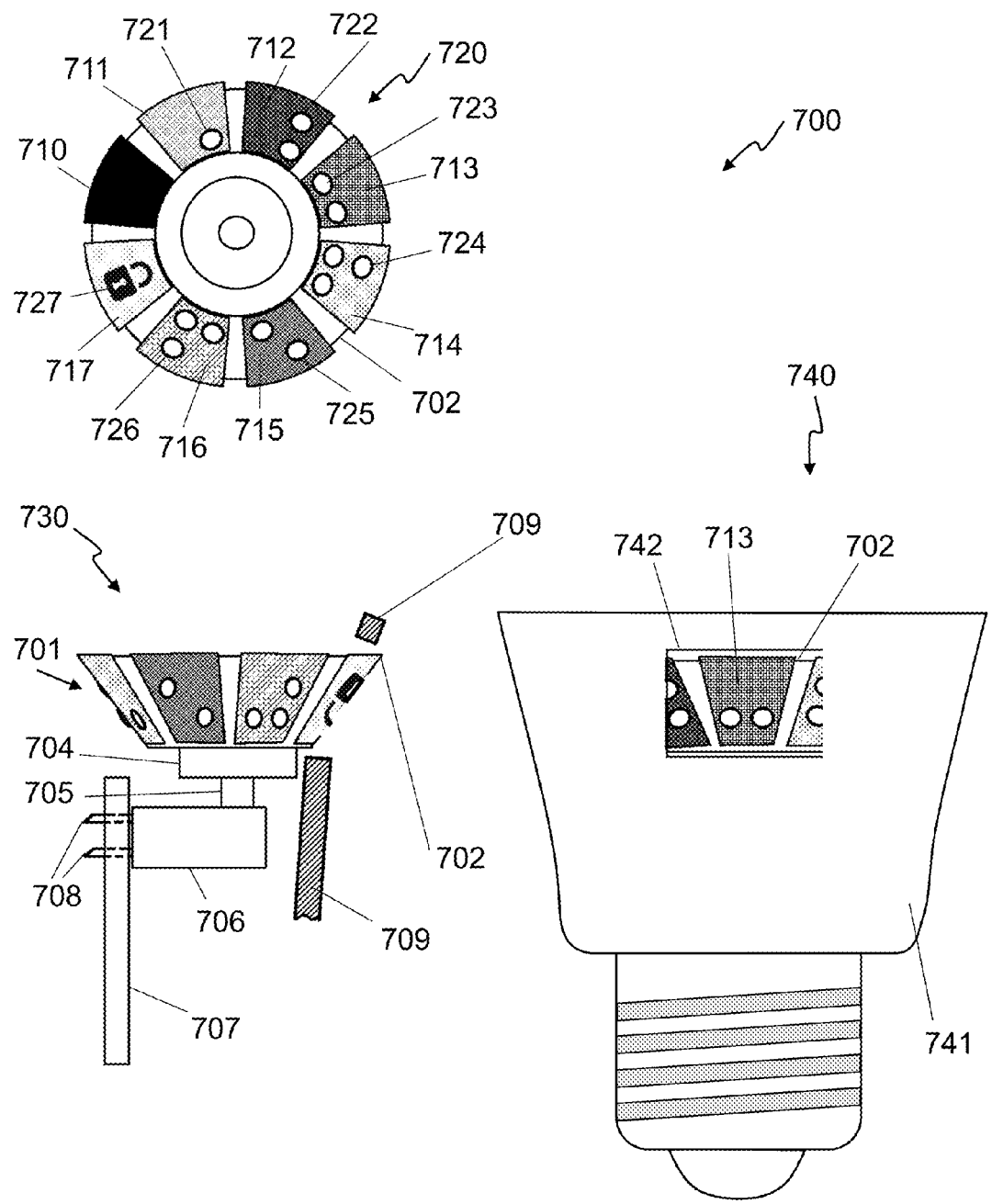
FIG. 7 shows an alternative embodiment of a color wheel.

FIG. 7 shows another alternative embodiment of a color selection mechanism 700 to allow a user to select a color. Top view 720 shows the color wheel from the top and side view 730 shows the color wheel from the side with some associated structure that has been omitted from the top view 720 for clarity. The color wheel mechanism 700 has a color wheel with an angled side 701, an edge 702 at the outermost part of the angled side 701, and a hub 704. The angle of the angled side 701 may range from 0 (parallel with the axis) to nearly 90 degrees (nearly flat). The edge 702 may be knurled or textured to give better grip as it is rotated by the user. A plurality of colored sections 710-717 are included on the angled side 701. The colored sections 710-717 may be immediately adjacent to each other or may have some space with a neutral color between them as is shown in this embodiment. This embodiment has eight sections, each section a different color as defined in FIG. 1. In this embodiment, section 710 is color 0, section 711 is color 1, section 712 is color 2, section 713 is color 3, section 714 is color 4, section 715 is color 5, section 716 is color 6, and section 717 is color 9. In this embodiment, visible and tactilely recognizable symbols are also included on some of the sections. Section 711 has the braille symbol for one 721, section 712 has the braille symbol for two 722, section 713 has the braille symbol for three 723, section 714 has the braille symbol for four 724, section 715 has the braille symbol for five 725, section 716 has the braille symbol for six 726, and section 717 has a raised padlock symbol 727. Other embodiments may use other tactilely recognizable symbols. Yet other embodiments may not include tactilely recognizable symbols. In other embodiments the tactilely recognizable symbols may not be readily visible and other visible symbols may or may not be included. The colors on the angled edge 701 represent seven non-locking colors 0-6 and one locking color 9 which is white. The color wheel hub 704 is attached to the shaft 705 of a rotary dip switch 706 that may be mounted on a printed circuit board 707. As the color wheel is turned, it turns the shaft 705 of the rotary dip switch 706 which generates information depending on the rotational angle of the shaft 705. The information is then available on the pins 708 (not all pins are shown) of the rotary dip switch 706. The pins 708 may be connected to pull-up resistors and a controller located on the same printed circuit board (or elsewhere in the networked device). In one embodiment the rotary dip switch is an octal encoder that generates 3 bits of output that can either be connected to ground or left as an open circuit so that as each output is connected to a pull-up resistor, the output represents a binary number between 000 and 111. Other methods of encoding the angular position of the color wheel could also be used such as an optical shaft encoder, a magnetic detector, two-axis hall-effect sensors or other well-known methods of detecting the angular position of a disk or shaft.

A cross section of a wall 709 of the networked light bulb shows the edge 702 protruding through the wall and a portion of the angled side 701 visible through an opening in the wall 709. Exterior view 740 shows the outside of the networked light bulb with the wall 741 having an opening 742. In the position shown, section 713 is filling most of opening 742. The color selection mechanism 700 may be designed to provide a detent at each section 710-717 to make it easy for the user to center the desired section in the opening 742.

Unless otherwise indicated, all numbers expressing quantities of elements, optical characteristic properties, and so forth used in the specification and claims are to be understood as being modified in all instances by the term "about." Accordingly, unless indicated to the contrary, the numerical parameters set forth in the preceding specification and attached claims are approximations that can vary depending upon the desired properties sought to be obtained by those skilled in the art utilizing the teachings of the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviations found in their respective testing measurements.

The recitation of numerical ranges by endpoints includes all numbers subsumed within that range (e.g. 1 to 5 includes 1, 1.5, 2, 2.75, 3, 3.80, 4, and 5).

As used in this specification and the appended claims, the singular forms "a", "an", and "the" include plural referents unless the content clearly dictates otherwise. Thus, for example, reference to an element described as "an LED" may refer to a single LED, two LEDs or any other number of LEDs. As used in this specification and the appended claims, the term "or" is generally employed in its sense including "and/or" unless the content clearly dictates otherwise.

As used herein, the term "coupled" includes direct and indirect connections. Moreover, where first and second devices are coupled, intervening devices including active devices may be located there between.

Any element in a claim that does not explicitly state "means for" performing a specified function, or "step for" performing a specified function, is not to be interpreted as a "means" or "step" clause as specified in 35 U.S.C. §112, ¶6. In particular the use of "step of" in the claims is not intended to invoke the provision of 35 U.S.C. §112, ¶6.

The description of the various embodiments provided above is illustrative in nature and is not intended to limit the invention, its application, or uses. Thus, variations that do not depart from the gist of the invention are intended to be within the scope of the embodiments of the present invention. Such variations are not to be regarded as a departure from the intended scope of the present invention.

What is claimed is:

1. A method for configuring a networked lighting apparatus comprising:
    generating a selected color code corresponding to a color selected from a plurality of colors, the plurality of colors having at least one locking color and one or more non-locking colors and each color of the plurality of colors having a corresponding color code;
    disabling a network connection if the color selected is the at least one locking color; and
    only if the color selected is one of the one or more non-locking colors,
        (a) connecting to the network,
        (b) sending the selected color code over the network, and
        (c) changing a state of the networked lighting apparatus in response to a message received over the network.

2. The method for configuring the networked lighting apparatus of claim 1 further comprising responding to a request for status information from the network only if the color selected is one of the one or more non-locking colors.

3. The method for configuring the networked lighting apparatus of claim 1 further comprising:
    receiving a local control action;
    changing the state of the networked lighting apparatus in response to the local control action only if the color selected is one of the one or more non-locking colors.

4. The method for configuring the networked lighting apparatus of claim 1 wherein the state of the networked lighting apparatus being changed is a brightness level of the networked lighting apparatus.

5. The method of configuring the networked lighting apparatus of claim 4 wherein the brightness level is limited to On and Off.

6. The method of configuring the networked lighting apparatus of claim 4 further comprising:
    setting the brightness level of the networked lighting apparatus to at least 10% of maximum if the color selected is the at least one locking color.

7. A networked light bulb comprising:
    a light emitting apparatus;
    a controller;
    a network adapter communicatively coupled to the controller; and
    a color selection mechanism communicatively coupled to the controller, the color selection mechanism allowing a user to select a color from a plurality of colors, the plurality of colors having at least one locking color and one or more non-locking colors; wherein
    the color selection mechanism communicates information corresponding to the color selected by the user to the controller;
    if the color selected by the user is the at least one locking color, the controller disables the network adapter; and
    if the color selected by the user is one of the one or more non-locking colors,
        (a) the controller converts the information communicated by the color selection mechanism to a color code corresponding to the color selected by the user,
        (b) the controller communicates the color code to the network adapter,
        (c) the network adapter sends the color code out over the network,
        (d) the network adapter receives a message from the network to change a state of the networked light bulb and communicates it to the controller, and
        (e) the controller changes the state of the networked light bulb in response to the message to change the state of the networked light bulb communicated by the network adapter.

8. The networked light bulb of claim 7 in which the network adapter connects to a wireless network selected from the group consisting of Wi-Fi, Z-wave and Zigbee.

9. The networked light bulb of claim 7 in which the controller and the network adapter are integrated on a single integrated circuit.

10. The networked light bulb of claim 7 in which
    the network adapter receives a status request message from the network and communicates it to the controller only if the color selected by the user is one of the one or more non-locking colors; and
    the controller responds to the status request message communicated by the network adapter by communicating a response message to the network adapter to send out over the network.

11. The networked light bulb of claim 7 in which the state of the networked light bulb being changed is a brightness level of the light emitting apparatus.

12. The method of configuring the networked lighting apparatus of claim 11 wherein the brightness level is limited to On and Off.

13. The networked light bulb of claim 7, the color selection mechanism comprising:
   a rotary switch with a rotatable shaft and an output communicatively coupled to the controller; and
   a color wheel having a center, an edge and a colored area, the center of the color wheel coupled to the shaft of the rotary switch and the colored area divided into sections, each section imprinted with a section color selected from the plurality of colors; such that
   as the color wheel is rotated by user manipulation of the edge, the colored area of the color wheel and the rotatable shaft of the rotary switch also rotate; and
   the output of the rotary switch communicates current rotational position information corresponding to the color selected by the user to the controller.

14. The networked light bulb of claim 13, the color selection mechanism further comprising:
   a selection mark in close physical proximity to the section of the colored area of the color wheel imprinted with the section color corresponding to the color selected by the user at the current rotational position.

15. The networked light bulb of claim 13 further comprising an outer housing with an aperture; wherein
   the color wheel is mounted in the networked light bulb so that,
   a portion of the edge of the color wheel protrudes from the outer housing of the networked light bulb, whereby the user is able to manipulate the edge to rotate the color wheel about its center;
   a portion of the colored area is visible through the aperture in the outer housing of the networked light bulb; and
   a majority of the portion of the colored area visible through the aperture in the outer housing of the networked light bulb is the section of the colored area imprinted with the section color corresponding to the color code selected by the user at the current rotational position.

16. The networked light bulb of claim 13 in which at least one section of the colored area is also imprinted with a visible symbol.

17. The networked light bulb of claim 13 in which at least one section of the colored area has a tactilely recognizable symbol.

* * * * *